US012707315B2

(12) United States Patent
Abdelshahid et al.

(10) Patent No.: US 12,707,315 B2
(45) Date of Patent: Aug. 11, 2026

(54) LATENCY MANAGEMENT FOR NETWORK-CONNECTED EXTENDED REALITY DEVICES

(71) Applicant: T-MOBILE INNOVATIONS LLC, Overland Park, KS (US)

(72) Inventors: Wafik Abdelshahid, Kenmore, WA (US); Ming Shan Kwok, Seattle, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 614 days.

(21) Appl. No.: 18/081,199

(22) Filed: Dec. 14, 2022

(65) Prior Publication Data

US 2024/0205725 A1 Jun. 20, 2024

(51) Int. Cl.
*H04W 28/02* (2009.01)
*H04L 47/2416* (2022.01)

(52) U.S. Cl.
CPC ..... *H04W 28/0236* (2013.01); *H04L 47/2416* (2013.01)

(58) Field of Classification Search
None
See application file for complete search history.

(56) References Cited

U.S. PATENT DOCUMENTS

2019/0260458 A1* 8/2019 Zhou .................... H04B 7/0695
2021/0034222 A1* 2/2021 Brems .................. H04N 13/332
2021/0158620 A1* 5/2021 Saraf ...................... G06F 3/011
2022/0012920 A1* 1/2022 Beith ...................... G06F 21/62
2022/0095313 A1* 3/2022 Kim ...................... H04L 1/1883
2022/0174111 A1* 6/2022 Lopez Mendez ..... H04L 67/568
2022/0217713 A1* 7/2022 Lei ........................ H04W 72/23
2022/0253126 A1* 8/2022 Holland .................. G06F 3/011
2022/0279602 A1* 9/2022 Xue ........................ H04L 65/80
2023/0360227 A1* 11/2023 Holmes ................ H04N 19/577
2023/0368811 A1* 11/2023 Zavesky ................. G10L 25/48
2023/0401958 A1* 12/2023 Palamadai .............. H04W 4/40
2024/0322922 A1* 9/2024 Elshafie ................ H04W 24/10

FOREIGN PATENT DOCUMENTS

WO 2021/253207 A1 12/2021

OTHER PUBLICATIONS

European search report received for European Application No. 23216607.4, mailed on Apr. 23, 2024, 9 pages.

* cited by examiner

*Primary Examiner* — Wutchung Chu
*Assistant Examiner* — Berhanu D Belete
(74) *Attorney, Agent, or Firm* — SHOOK, HARDY & BACON L.L.P.

(57) ABSTRACT

Embodiments of the present disclosure are directed to systems and methods for predicting high latency conditions for a data connection between an extended reality device and a wireless telecommunication system. A schedule associated with downlink and/or uplink grants at a base station is queried to determine if it comprises a sufficient number of grants in an upcoming time period to adequately serve the extended reality device. If it does not, the extended reality device can implement mitigating actions to reduce data consumption in the downlink or data transmission in the uplink to minimize undesirable effects to user experience and device performance.

19 Claims, 5 Drawing Sheets

LATENCY MANAGEMENT FOR NETWORK-CONNECTED EXTENDED REALITY DEVICES

SUMMARY

The present disclosure is directed to managing latency of extended reality (XR) devices and applications utilizing a wireless connection to a telecommunication network, substantially as shown and/or described in connection with at least one of the Figures, and as set forth more completely in the claims.

According to various aspects of the technology, latency-impacting scheduling conditions are communicated to XR devices or a conventional user equipment (UE) utilizing an XR application in order for the device to take appropriate mitigating actions. XR devices and UEs running XR applications are becoming increasingly prolific and often require robust data connections to function as intended. When using XR, momentary but sudden increases in latency, jitter, or any other performance degradation can cause the XR experience to jump from one scene to another without fluidity—essentially having a strobe-like effect for a user. Aside from the performance degradation, such undesirable conditions can cause a user to get frustrated or even motion sick, especially with reduced fluidity or fewer-than-normal degrees of freedom. However, device-based solutions that detect or predict latency and jitter either implement mitigating procedures too late to avoid the undesirable effects (detection-based triggers) or implement them imprecisely (prediction-based triggers). Instead, the present disclosure utilizes a network-implemented paradigm to more accurately determine when latency/jigger is likely to occur, facilitating more timely and precise device-side mitigation.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
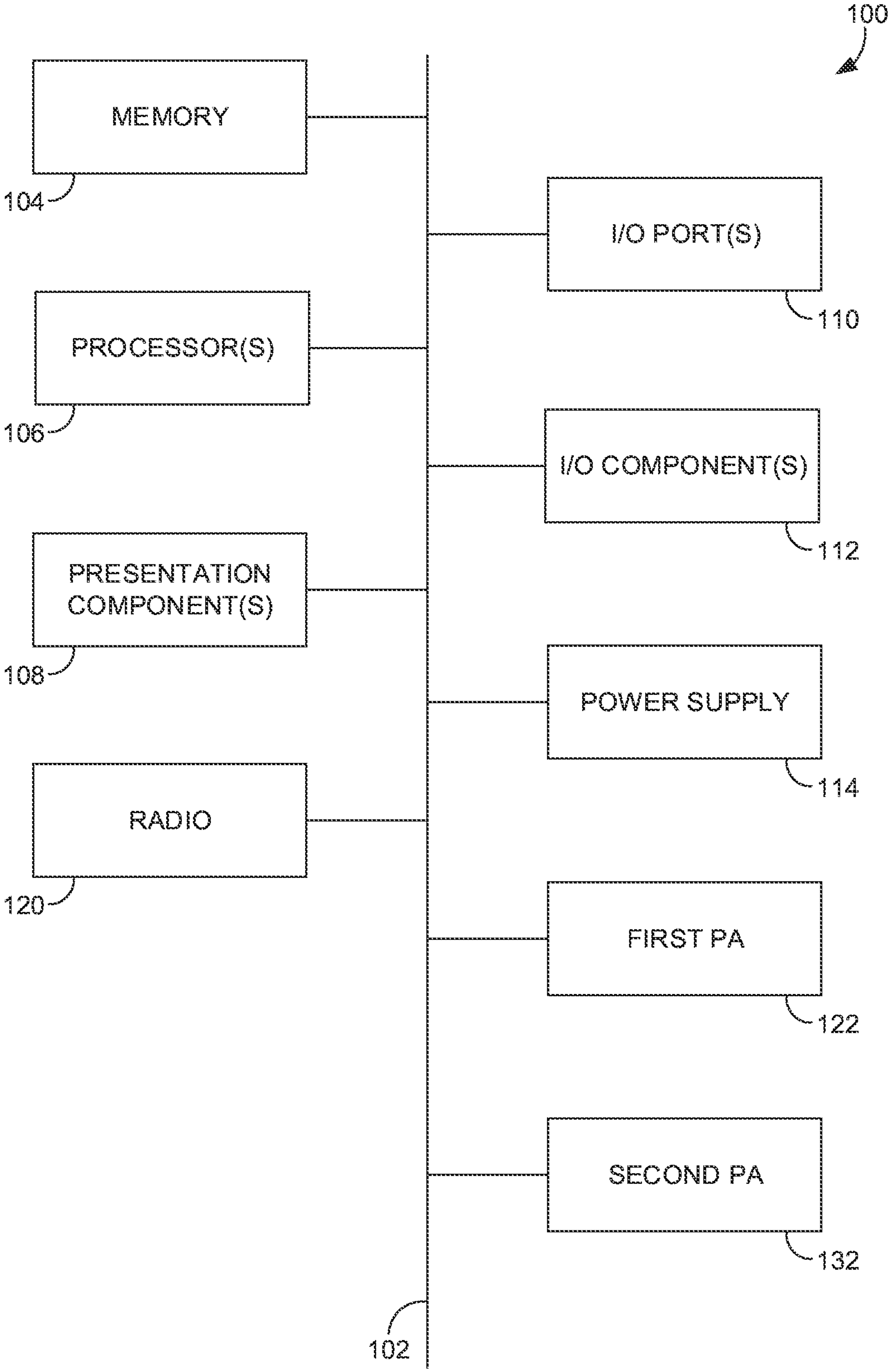
FIG. 1 illustrates an exemplary computing device for use with the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32*d* Edition, 2022). As used herein, the term "base station" refers to a centralized component or system of components that is configured to wirelessly communicate (receive and/or transmit signals) with a plurality of stations (i.e., wireless communication devices, also referred to herein as user equipment (UE(s))) in a geographic service area. A base station suitable for use with the present disclosure may be terrestrial (e.g., a fixed/non-mobile form such as a cell tower or a utility-mounted small cell) or may be extra-terrestrial (e.g., an airborne or satellite form such as an airship or a satellite). The terms "latency" and "jitter" are used in their ordinary sense; that is, latency refers to the time it takes for a packet (or series of packets) to travel from its source to its destination (via a network), and jitter refers to variations in latency.

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media. Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, extended reality (XR) is a category of technologies that modify or replace a user's perception of their surroundings, typically by way of a wearable device with sensory outputs (visual display, tactile output, audible output, and the like). At least for the purposes of the present disclosure, the concepts of augmented reality (AR), mixed reality (MR), and virtual reality (VR) are all encompassed by the category of XR. In AR and MR, computer-generated information is displayed with (e.g., superimposed over) a user's actual surroundings; often, such technology is utilized by smartphones or other UEs that utilize a rear-facing camera and forward-facing display to overlay simulated (i.e., computer-generated) data with the real surroundings as captured by the camera. In VR, a simulated environment entirely supplants the user's actual surroundings, often accomplished by goggles or other immersive and wearable technology. In order for XR to operate effectively, robust connections and/or computer processing components are required. Particularly when used to interact with other users, the ability of XR to function effectively relies on a high performing and highly stable data connection. Traditionally, wireless connections to cellular or other telecommunication networks were relatively unaffected by modest disturbances to throughput, latency, and jitter; for example, users may not detect disturbances lasting 200 ms or less when leveraging a wireless connection for messaging and ordinary data sessions. However, the human eye can easily perceive discontinuous motion with gaps as little as a few milliseconds; that is, if a user was using XR and the data connection supporting the computer-generated graphics experienced a disturbance lasting more than a few milliseconds, the user would be likely to notice. Discontinuous display of computer-generated graphics could easily lead to user frustration, motion sickness, hesitation to technological adoption, or cessation of existing use—all due to degradations in XR performance.

In order to mitigate the effects of dynamic data connections, existing solutions implement mitigating operations (e.g., reducing available degrees of motion, modifying the compression rate, and/or repeating images from a buffer) as a result of a UE either detecting that latency/jigger had degraded or predicting that it will degrade based on previous observations. In a detection-based scheme, a device executing XR may detect, in real time, that latency or jitter is increasing or may determine by way of performance of the device that latency/jigger is increasing. In a prediction-based scheme, the device executing XR may predict whether or not latency/jigger is likely to degrade to an undesirable level based on an analysis of immediately prior data; for example, at a particular moment in time, the device may determine that latency/jigger have steadily increased over the last 200 ms and predict that it will cross a threshold for implementing mitigating actions in the next 100 ms and maintain the mitigating actions for a predetermined period of time (e.g., 500 ms). That is to say, all known solutions to mitigating undesirably degraded data connections for XR devices are based on a determination by the device itself, and based on what it either has experienced or is currently experiencing.

In contrast to conventional device-based and reactive solutions, the present solution is directed to using a network-based solution to proactively determine when data connections are likely to fall below a threshold for XR devices that would require the implementation of mitigating actions by an XR device. Once it is determined that a particular device is associated with an XR application, an entity of the network, such as one or more components of the radio access network (RAN), may monitor the scheduling of radio resources assigned to the particular device. Based on a determination that no (or fewer than a predetermined threshold amount) radio resources will be allocated for the particular device during an upcoming time period, the network will communicate an indication to the particular device representing that a high latency/jitter condition is likely to exist in an upcoming period. Once the device receives the indication, it can implement one or mitigating actions preemptively in order to avoid the negative effects of what will likely soon be a high latency/jitter condition.

Accordingly, a first aspect of the present disclosure is directed to a system for managing latency for network-connected extended reality devices comprising. The system comprises a base station configured to wirelessly communicate with a user equipment (UE) and one or more computer processing components communicatively coupled to the base station. The one or more computer processing components are configured to determine, based on an indication received from the UE, that the UE is engaged in XR activity. The one or more computer processing components are further configure to communicate a high latency indication to the UE based on a determination that an amount of radio resources allocated to the UE in an upcoming time period is less than a predetermined threshold associated with XR activity.

A second aspect of the present disclosure is directed to a method for mitigating high latency in a data connection with a UE comprising one or more computer components configured to perform a method comprising determining, based on an indication received from the UE, that the UE is engaged in latency-sensitive activity. The method further comprises determining that an amount of radio resources allocated to the UE in an upcoming time period is less than a predetermined threshold associated with supporting the latency-sensitive activity. The method further comprises communicating a high latency indication to the UE.

Another aspect of the present disclosure is directed to one or more non-transitory computer readable media that, when executed by one or more computer processing components, cause the one or more computer processing components to perform a method for mitigating high latency in a UE. The method comprises determining, based on an indication received from the UE, that the UE is engaged in latency-sensitive activity. The method further comprises communicating a high latency indication to the UE based on a determination that an amount of radio resources allocated to the UE in an upcoming time period is less than a predetermined threshold associated with supporting the latency-sensitive activity.

According to another aspect of the technology described herein, a method for mitigating latency in a UE is provided. The method comprises communicating an indication to a base station that the extended reality device is performing XR activity. The method further comprises receiving, from the base station, a first high latency indication. The method further comprises implementing a first set of one or more latency mitigation actions.

Yet another aspect of the present disclosure is directed to a latency sensitive system in a wireless telecommunication network. The system comprises one or more wireless transceivers configured to wirelessly communicate with a base station of the wireless telecommunication network. The system further comprises one or more computer processing components that are configured to cause an indication to be communicated to the base station that the system is engaged in latency-sensitive activities. The one or more computer processing components are further configured to determine, based on an indication received from the base station, that a data connection between the system and the base station will experience latency in an upcoming time period that exceeds a predetermined threshold. The one or more computer processing components are further configured to perform one or more mitigating actions to reduce the data consumption of the system during the upcoming time period. The system further comprises a graphical display configured to display at least a portion of the data provided to the system in the upcoming time period.

Referring to FIG. 1, an exemplary computer environment is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 may be referred to herein as a user equipment, wireless communication device, or user device, The computing device 100 may take many forms; non-limiting examples of the computing device 100 include a fixed wireless access device, cell phone, tablet, internet of things (IOT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

A first radio 120 and second radio 130 represent radios that facilitate communication with one or more wireless networks using one or more wireless links. In aspects, the first radio 120 utilizes a first transmitter 122 to communicate with a wireless network on a first wireless link and the second radio 130 utilizes the second transmitter 132 to communicate on a second wireless link. Though two radios are shown, it is expressly conceived that a computing device with a single radio (i.e., the first radio 120 or the second radio 130) could facilitate communication over one or more wireless links with one or more wireless networks via both the first transmitter 122 and the second transmitter 132. Illustrative wireless telecommunications technologies include CDMA, GPRS, TDMA, GSM, and the like. One or both of the first radio 120 and the second radio 130 may carry wireless communication functions or operations using any number of desirable wireless communication protocols, including 802.11 (Wi-Fi), WiMAX, LTE, 3G, 4G, LTE, 5G, NR, VOLTE, or other VoIP communications. In aspects, the first radio 120 and the second radio 130 may be configured to communicate using the same protocol but in other aspects they may be configured to communicate using different protocols. In some embodiments, including those that both radios or both wireless links are configured for communicating using the same protocol, the first radio 120 and the second radio 130 may be configured to communicate on distinct frequencies or frequency bands (e.g., as part of a carrier aggregation scheme). As can be appreciated, in various embodiments, each of the first radio 120 and the second radio 130 can be configured to support multiple technologies and/or multiple frequencies; for example, the first radio 120 may be configured to communicate with a base station according to a cellular communication protocol (e.g., 4G, 5G, 6G, or the like), and the second radio 130 may configured to communicate with one or more other computing devices according to a local area communication protocol (e.g., IEEE 802.11 series, Bluetooth, NFC, z-wave, or the like).

Figure 2:
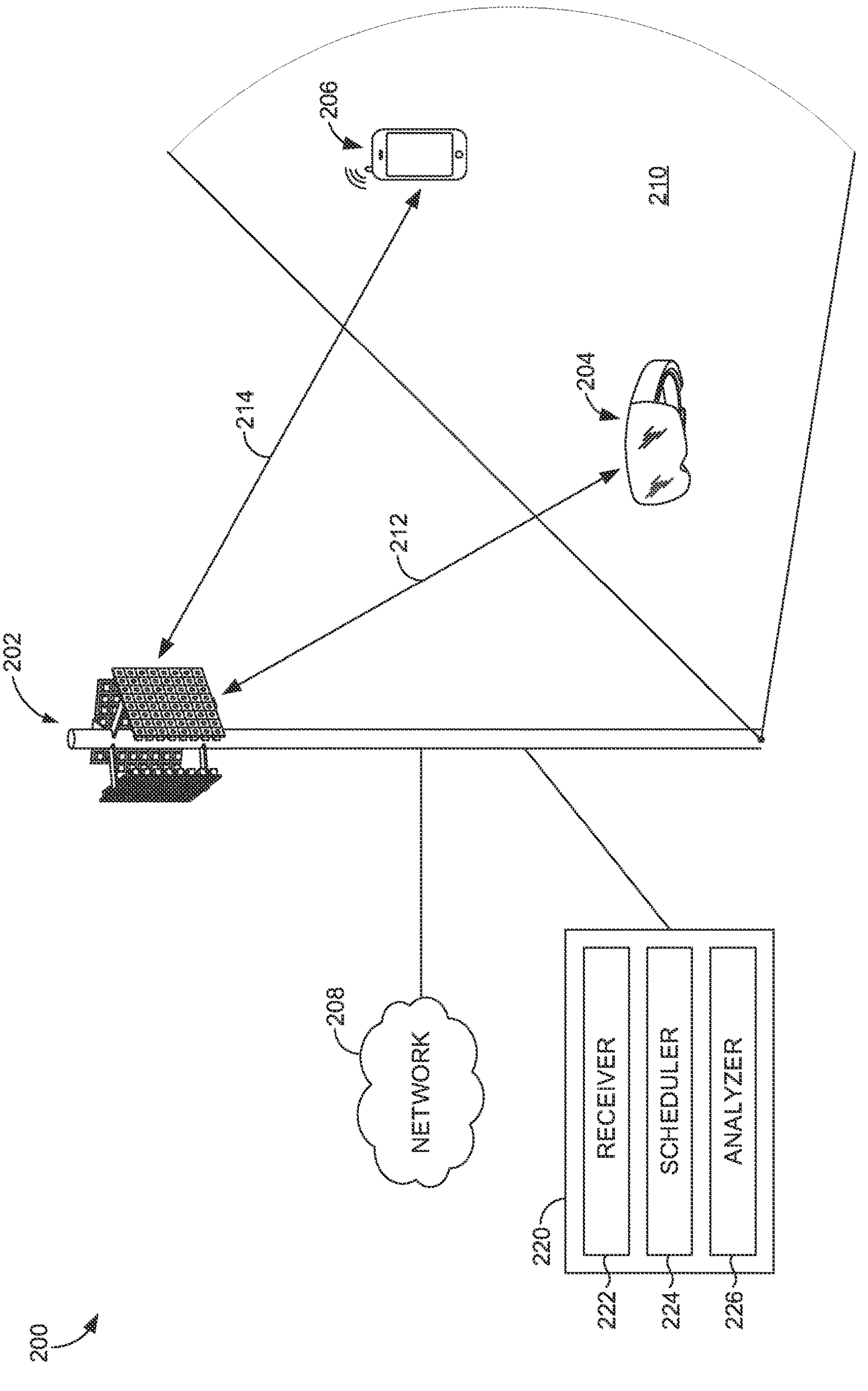
FIG. 2 illustrates a diagram of an exemplary environment in which implementations of the present disclosure may be employed.

Turning now to FIG. 2, a representative network environment in which the present disclosure may be carried out is illustrated. Such a network environment is illustrated and designated generally as network environment 200. Network environment 200 is but one example of a suitable network environment and is not intended to suggest, including by the form of any illustrated component thereof, any limitation as to the scope of use or functionality of the invention. Neither should the network environment be interpreted as having any dependency or requirement relating to any one or combination of components illustrated. The network environment 200 generally represents a high-level model for wirelessly communicating between a base station and one or more XR devices, as discussed in greater detail herein. The network environment 200 comprises a base station 202, a first user equipment (UE) 204, a second UE 206, and a network 208. The network environment 200 may also be said to one or more computer processing components that form a latency prediction engine 220.

The network environment 200 comprises at least one base station 202 that is configured to wirelessly communicate with one or more user devices, such as the computing device 100 of FIG. 1, which may take the form of the first UE 204 and/or the second UE 206. For the purposes of this disclosure, a base station is used in its general sense, being defined as a station for transmitting and/or receiving RF signals; accordingly, the base station 202 may take the form of a cellular node (e.g. eNodeB, gNodeB, etc.), a relay, an access point (e.g., a Wi-Fi router), or any other desirable emitter and/or receiver of signals that transmits and/or receives wireless signals to/from one or more UEs. A suitable base station is not protocol-specific, it may be configured to be any wireless telecommunication protocol that is compatible with the first UE 204 and/or the second UE 206, such as 4G, 5G, 6G, 802.11x, or any other wireless standard. A suitable base station is also not exclusive to cellular telecommunication networks, it may take the form of any wireless communication system and used at any desirable frequency (e.g., microwave relays). Base stations consistent with the present disclosure may be configured to provide coverage to certain geographic service area, such as the geographic service area 210, and will have one or more backhaul connections that connect it to a broader telecommunications and/or information network, such as the network 208, for the provision of telecommunication and/or information service (s) to the first UE 204 and/or the second UE 206. As illustrated, the base station 202 may take the form of a macro cell; however, the base station 202 may take any desirable form, such as a small cell, or a residential Wi-Fi router. As seen in the embodiment illustrated by FIG. 2, base stations suitable for use in the present disclosure may be terrestrial, that is, they are coupled to the earth via a tower or some other structure, such as the first base station 210; alternatively, a suitable base station may be extra-terrestrial, that is coupled to an aircraft or a satellite.

The network environment 200 comprises the network 208. The network 208 comprises any number of components that are generally configured to provide voice and/or data services to wireless communication devices, such as the first UE 204 and the second UE 206, which are wirelessly connected to the base station 202. For example, the network 208 may comprise one or more additional wireless base stations, a core network, an IMS network, a PSTN network, or any number of servers, computer processing components, and the like. The network 208 may include access to the World Wide Web, internet, or any number of desirable data sources which may be queried to fulfill requests from wireless communication devices that make requests via the base station 202.

The network environment 200 comprises one or more UEs, with which the base station 202 connects to the network 208. Generally, each of the first UE 204 and the second UE 206 may have any one or more features or aspects described with respect to the computing device 100 of FIG. 1. Though the first UE 204 is illustrated as a dedicated XR-specific device (e.g., wearable VR goggles) and the second UE 206 is illustrated as an XR-agnostic device (illustrated as a smart phone), it should be understood that each of the first UE 204 and the second UE 206 may take any form of an XR device. As used herein, the term "XR device" means any computing device that is executing an XR application. An XR device may be in the form of an XR-specific device (e.g., VR goggles, AR glasses), which is designed and intended for use primarily with XR applications. An XR device may alternatively be in the form of an XR-agnostic device, such as the second UE 206 in the case as illustrated in FIG. 2, wherein an XR-agnostic device refers herein to a device that is capable of executing (or is presently executing) an XR application but which is not designed or intended primarily for executing XR applications. For example, an XR-agnostic device may be a more general computing device that is capable of executing an XR application thereon (e.g., a smart phone or a tablet).

For the purposes of the present disclosure, the first UE 204 and/or the second UE 206 utilize a wireless data connection with the base station 202 in order to render the computer-generated (i.e., simulated) graphics that are displayed or otherwise output for a user on one or more interfaces of the XR device. Accordingly, the first UE 204 may be said to have a first wireless connection 212 with the base station 202 and the second UE 206 may be said to have a second wireless connection 214 with the base station 202.

Each of the first UE 204 and the second UE 206 are physically located within the geographic service area 210 served by the base station 202, with the first UE 204 relatively near the base station 202 and the second UE 206 relatively far from the base station 202 (which may also be referred to herein as at or near the cell edge of the geographic service area 210).

In order to communicate with first UE 204, the base station 202 uses the first wireless connection 212 in the air interface, wherein one or more sets of downlink signals are sent to the first UE 204 from the base station 202 and one or more sets of uplink signals are communicated from the first UE 204 to the base station 202. Likewise, in order to communicate with second UE 206, the base station 202 uses the second wireless connection 214 in the air interface, wherein one or more sets of downlink signals are sent to the second UE 206 from the base station 202 and one or more sets of uplink signals are communicated from the second UE 206 to the base station 202. Though illustrated as straight lines representing a single, direct, line of sight connection, one skilled in the art will appreciate that the reality of RF communications means that the first wireless connection 212 and/or the second wireless connection 214 may not be singular (i.e., there may be multiple paths), may not be direct (i.e., there may be reflections and/or refractions that cause the connection(s) to have multiple or indirect paths), and it may not be line of sight (i.e., the connection(s) may be reflected off structures, the ground, or the ionosphere, whether or not a direct line of sight connection exists). Though a single base station is illustrated in FIG. 2, the network environment 200 may comprise multiple base stations, including multiple base stations that serve the same UE, such as through the use of dual connectivity technology; further, additional base stations may provide overlapping or auxiliary coverage in the event an outage occurs at the base station 202. For the purposes of present disclosure, it is sufficient to illustrate that one or more sets of downlink signals originate from, and one or more uplink signals are received at, the base station 202, which utilizes wireless connections to bridge connected UEs to the network 208.

The network environment 200 comprises one or more computer processing components that form the latency prediction engine 220. The latency prediction engine 220 may comprise one or more components, taking the form of any combination of hardware components, logical components, and computer-programmed services running on one or more computer processing components that are generally configured to identify a high latency condition and communicate a high latency indication to a UE such as the first UE 204 or the second UE 206. The latency prediction engine 220, including its one or more subcomponents, may be disposed at or near the base station 202, within or adjacent to the network 208, or disposed in multiple locations. As discussed in the present disclosure, the subcomponents of the latency prediction engine 220 are divided by function; however, more or fewer components may carry out the functions of the latency prediction engine 220, and the functionality described herein with respect to particular subcomponents of the latency prediction engine 220 may be performed by other subcomponents of the latency prediction engine 220 without departing from the inventive concept conceived herein. Accordingly, the latency prediction engine 220 may be said to comprise a receiver 222, a scheduler 224, and an analyzer 226.

The receiver 222 is generally configured to receive information relating to the network environment 200. The receiver 222 may receive, from the base station 202, an indication that scheduled downlink or uplink data is associated with an XR device (e.g., based on a data request from the XR device or data received from the XR device). For example, the receiver 222 may receive a device type identifier from the first UE 204 that indicates the first UE 204 is an XR-specific device and assume, based on the device type identifier, that any downlink or uplink data between the base station 202 and the first UE 204 is for use with an XR application. In another example, the receiver 222 may receive an indication that an XR device has requested data, set up a data session, or otherwise interacted with the base station 202 to indicate that the an XR-agnostic device such as the second UE 206 is running an XR application. In one aspect, such an indication may be present in the uplink control information communicated from the first and/or second UE 204, 206 to the base station 202. In yet other aspects, the receiver may not receive a device type indicator directly from a connected UE that it is an XR-specific UE, such as the first UE 204; instead, the receiver 222 may receive one or more device identifiers of the first UE 204 (e.g., IMEI number, IMSI number, and the like) and then utilize the device identifier in a query (such as to one or more data repositories of the network 208) to determine that the type of the first UE 204 is an XR-specific UE. In addition to the XR identifier, the receiver 222 may further receive information used by the scheduler 224 to perform scheduling operations; for example, the receiver 222 may receive data requests from a UE, receive power headroom reports, uplink key performance indicator (KPI) measurements (e.g., RSRP, RSRQ, SINR, latency, jitter, and the like), and device capabilities (e.g., modulation coding scheme (MCS) abilities), among others.

Figure 3A:
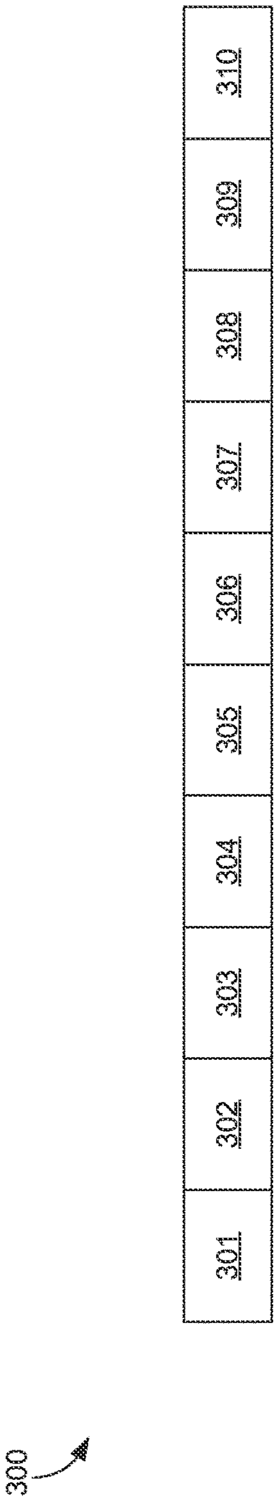
FIGS. 3A-3B illustrate exemplary frame structures for use with the present disclosure.
Figure 3B:
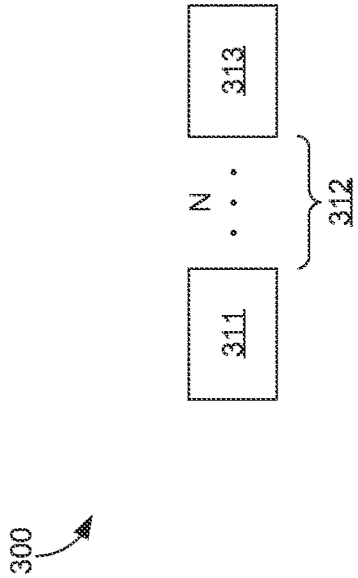

The scheduler 224 is generally configured to schedule downlink and uplink traffic between the base station 202 and each of the first UE 204 and the second UE 206 (and any other UEs the base station 202 serves). The present disclosure is agnostic to the particularities of how downlink and/or uplink radio resources are scheduled (or other transmission characteristics that affect throughput, such as modulation coding schemes (MCS)); for example, a mobile network operator may prioritize certain traffic, certain types of subscribers, downlink vs. uplink, default to higher order MCS, and the like. For the purposes of the present disclosure, it is sufficient that the scheduler 224 assigns/allocates radio resources to one or more UEs on one or more frequencies at a particular moment in time and an amount of time into the future. FIG. 3A illustrates a radio frame 300 comprising subframes 301-310. Each of the subframes may comprise one or more slots, which themselves may comprise one or more symbols, which are used to carry information between the base station 202 and each UE served by the base station 202, as illustrated in FIG. 2. In the illustrated aspect shown in FIG. 3A, one or more subframes of radio frame 300 may be scheduled by the scheduler 224 for downlink traffic and one or more subframes of radio frame 300 may be scheduled by the scheduler 224 for uplink traffic. That said, it is also possible for the scheduler 224 to schedule all of the subframes 301-310 as downlink traffic or all as uplink traffic. The scheduler 224 schedules traffic beyond a present moment in time; that is, using FIG. 3B as illustrative, if at a present moment in time "T" the next subframe is subframe 311, a scheduler suitable for the present disclosure will schedule N number of subframes 312 into the future, ending in subframe 313, beyond which the scheduler 224 has not yet scheduled traffic. One skilled in the art would recognize that the discussion of subframes is representative and the scheduler 224 could be understood to schedule future traffic at the symbol-, slot-, or frame-level. Regardless of how an OEM or network operator opts to perform scheduling, each of the scheduler 224 and the receiver 222 communicate information to the analyzer 226 in order for the analyzer 226 to perform latency predictions.

Returning now to FIG. 2, the analyzer 226 is generally configured to determine that latency degradation is likely to occur at a time in the future and communicate a high latency indication to an affected XR device. In order to determine that a latency degradation is likely to occur at a time in the future, the analyzer 226 compares an amount of radio resources scheduled for a particular XR device in a future time period and compares that to a predetermined threshold associated with the XR device. The amount of radio resources scheduled in the future time period may be downlink radio resources, uplink radio resources, or a combination thereof. The predetermined threshold associated with the XR device may be static, wherein a fixed amount of minimum radio resources is based on a determination that a scheduled UE is an XR device, or the predetermined threshold associated with the XR device may be dynamic, wherein an amount of minimum radio resources required in a particular time period is based at least in part on the type of XR device (XR-specific, AR headset, XR-agnostic, or the like) and/or the type of XR activity being executed on the XR device (e.g., executing a first XR application may require fewer radio resources than executing a second XR application). For example, the analyzer 226 receives an indication from the receiver 222 that the first UE 204 is an XR device and an indication from the scheduler 224 that a first amount of radio resources are allocated to the first UE 204 in an upcoming time period (e.g., the next 3 radio frames), the analyzer 226 determines that the first amount radio resources is below a threshold associated with serving an XR device such as the first UE 204. In response, the analyzer 226 communicates a high latency indication (or causes another component to communicate the high latency indication) to the first UE 204. The first UE 204 may, based on receipt of the high latency indication, initiate one or more mitigating actions (e.g., reduce degrees of freedom, modify a compression rate, modify a rendering rate, or the like) to avoid undesirable affects caused by increased latency and/or jitter on the wireless link to the base station 202. In another example, the analyzer 226 receives an indication from the receiver 222 that the second UE 206 is an XR-agnostic device and an indication from the scheduler 224 that a second amount of radio resources are allocated to the second UE 206 in an upcoming time period (e.g., the next 3 radio frames; the analyzer 226 determines a radio resource threshold based on an identification of the second UE 206 as XR-agnostic (as opposed to XR-specific like the first UE 204) and an indication of the type of XR activity being performed by the second UE 206 (e.g., an AR application may require fewer radio resources than if it was mounted in a wearable device and being used for an MR or VR activity based on the fact that majority of the rendering on the display is based on input from an on-board optical sensor as opposed to data from the base station 202). Based on a determination by the analyzer 226 that the second amount of radio resources scheduled for the second UE 206 in the upcoming time period is less than the radio resource threshold, the analyzer 226 communicates a high latency indication (or causes a high latency indication to be communicated by another component) to the second UE 206, which may utilize the high latency indication as the trigger to implement one or more mitigating actions.

In some aspects, more than one latency threshold may be used to determine a latency severity that is communicated to UEs served by the base station 202. In addition to or in lieu of communicating a high latency indication to a UE as described above, the analyzer 226 may be configured to compare the amount of radio resources allocated to the UE in the upcoming time period against a plurality of thresholds in order to determine a latency severity; a first latency threshold may be associated with a minor performance degradation and a second latency threshold with a moderate performance degradation. For example, based on an indication from the receiver 222 and an indication from the scheduler 224, the analyzer 226 may determine that an amount of radio resources assigned to the first UE 204 in an upcoming time period (e.g., 2, 3, 5, 10 radio frames) may be less than a first predetermined threshold but greater than a second predetermined threshold—equating to a moderate performance degradation. If the amount of radio resources assigned to the first UE 204 in the upcoming time period was less than both the first predetermined threshold and the second predetermined threshold, then the severity indication may represent severe performance degradation. In aspects of the present disclosure, a first set of mitigating actions may be undertaken by the first UE 204 in response to an indication of moderate degradation and a second set of mitigating actions may be undertaken by the first UE 204 in response to an indication of severe degradation, wherein the first set of mitigating actions are less discernable to the user than the second set of mitigating actions (and wherein fewer radio resources are necessary to permit the first UE 204 to suitable execute an XR application when the second set of mitigating actions are being performed). One skilled in the art would appreciate that any number of severity thresholds may be used based on the preferences of an MNO, and that an increased number of thresholds would provide more specific information to an XR device at the expense of additional downlink radio resource consumption (e.g., in header fields).

Figure 4:
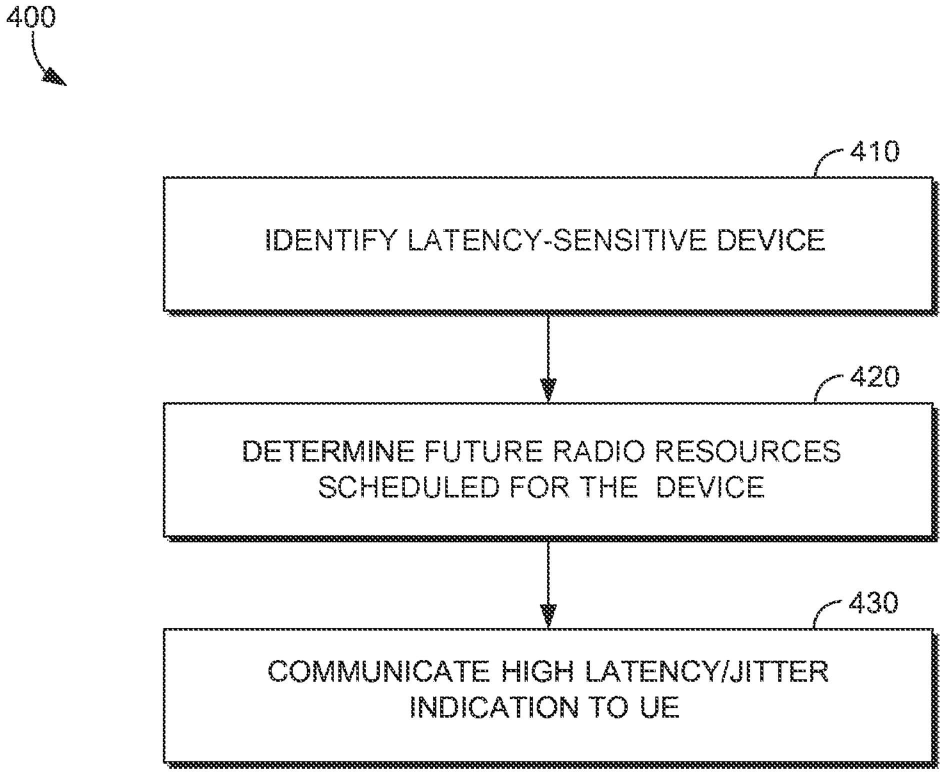
FIG. 4 depicts a flow diagram of an exemplary method for managing latency in wireless connections with an XR device.

Turning now to FIG. 4, a flow chart is illustrated for a method of managing latency in an XR device. At a first step 410, a UE connected to a base station is identified as an XR device, according to any one or more aspects described with respect to FIG. 2. In other aspects, the first step 410 may comprise an indication from the UE that it is engaged in activity that is latency-sensitive (regardless of whether that is based on the UE being an XR device or other reasons, such as a UE that is being used for non-XR gaming, such as massive multiplayer online games). At a second step 420, one or more computer processing components or modules executing thereon determine an amount of radio resources scheduled for the UE in a future time period subsequent to a present time, according to any one or more aspects described with respect to FIGS. 2-3B. At a third step 430, a high latency indication is communicated to the UE based on a determination that the amount of radio resources scheduled for the UE in the future time period subsequent to the present time is less than one or more predetermined thresholds, according to any one or more aspects described with respect to FIGS. 2-3B. Though not illustrated in FIG. 4, the method 400 may further comprise determining and communicating a latency severity indication to the UE based on which of a plurality of thresholds the first amount of radio resources exceeds and which of the plurality of thresholds the first amount of radio resources does not exceed, according to any one or more aspects described with respect to FIGS. 2-3B.

Figure 5:
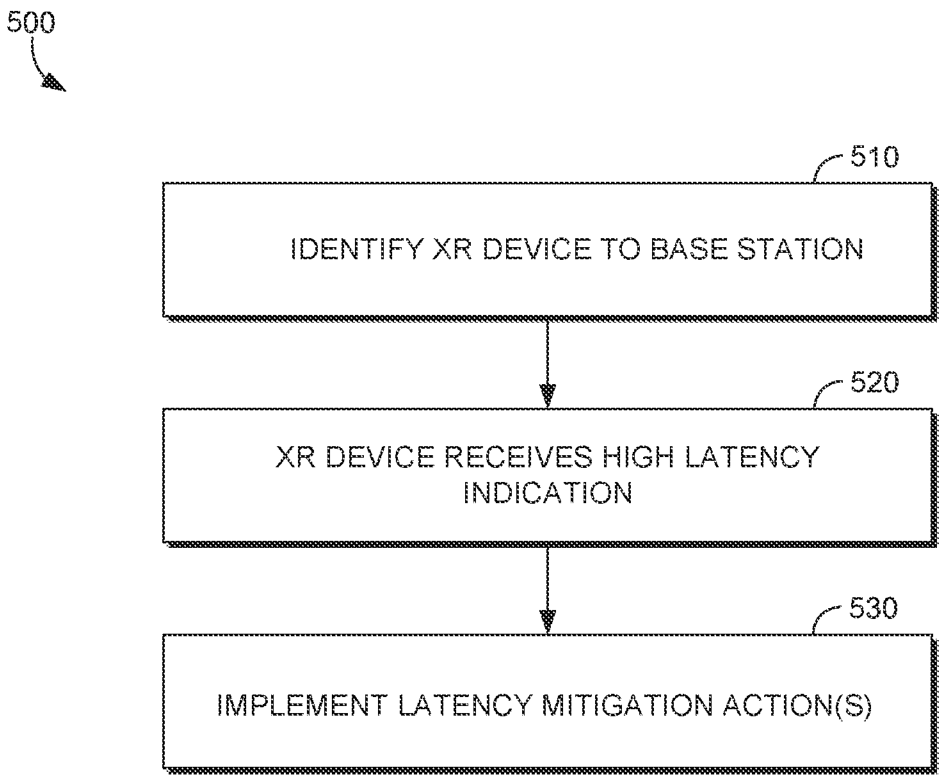
FIG. 5 depicts a flow diagram of an exemplary method for an XR device to mitigate high latency conditions, in accordance with aspects of the present disclosure.

Turning now to FIG. 5, a flow chart is illustrated for a method 500 of mitigating high latency associated with a wireless communication link. The method 500 comprises a first step 510 wherein a UE communicates an indication to a base station that is an XR device, according to any one or more aspects described with respect to FIG. 2; for example, the UE may communicate a device identifier that can be used by a telecommunication network to identify the UE as having an XR device type or it may communicate an affirmative indication to the telecommunication network that the UE has an XR device type. In some aspects, the UE may additionally or alternatively communicate an indication to the telecommunication network representing the type of XR activity being executed by the UE, or that the UE is not an XR device but is requesting data to support a latency-sensitive application such as an online multiplayer game. As noted with respect to FIG. 2, in addition to indicating that the UE is engaged in latency-sensitive activities, the UE may communicate one or more measurements or key performance indicators (e.g., SINR, power headroom, RSRP, device capabilities, and the like) that may be used by a scheduler such as the scheduler 224 of FIG. 2 to allocate/schedule future radio resources to the UE. At a second step 520, the UE receives a high latency indication from the telecommunication network, wherein said indication is based on a determination that an amount of radio resources scheduled for the UE during a future time period subsequent to a present time is less than a threshold, according to any one or more aspects of FIGS. 2-4. At a third step 530, and in response to receipt of the high latency indication, the UE may implement one or more mitigating actions, such as reducing the number of degree of freedom, modifying a rendering rate, modifying a frame rate, increasing a buffer length, or storing already-displayed data and repeating the display of the already-displayed data in a future time period (reducing or eliminating the data needed to support display of information in the immediate future).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A method for managing latency in an extended reality (XR) device comprising:

communicating an indication to a base station that the extended reality device is performing XR activity;

receiving, from the base station, a first high latency indication; and implementing a first set of one or more latency mitigation actions;

receiving a second high latency indication, wherein the first high latency indication is associated with a future latency exceeding a first predetermined threshold and the second high latency indication is associated with the future latency exceeding a second predetermined threshold, the second predetermined threshold being greater than the first predetermined threshold; and implementing a second set of one or more latency mitigation actions, wherein the second set of one or more latency mitigation actions have a greater impact on the XR activity than the first set of one or more latency mitigation actions.

2. The method of claim 1, wherein the indication represents a device type of the XR device, the device type being an XR-specific device.

3. The method of claim 1, wherein the indication represents a device identity, the device identity being previously registered with a network entity as having a device type, and wherein the device type is an XR-specific device.

4. The method of claim 1, wherein the indication represents that the UE is requesting data for use with an XR application running on the XR device.

5. The method of claim 1, wherein the one or more latency mitigation actions comprises reducing a number of degrees of freedom associated with the XR activity.

6. The method of claim 1, wherein the one or more latency mitigation actions comprises modifying a compression rate or a rendering rate.

7. The method of claim 1, wherein the one or more latency mitigation actions comprises utilizing buffered data for display on a graphic user interface of the XR device.

8. The method of claim 1, wherein the one or more latency mitigation actions comprises reducing a display frame rate on a graphic user interface of the XR device.

9. The method of claim 1, wherein the high latency indication comprises an allocation of radio resources in an upcoming time period, and wherein implementing the first set of one or more latency mitigation actions is based on a determination, by the XR device, that the allocation of radio resources in the upcoming time period is less than a threshold associated with executing the XR activity.

10. The method of claim 1, wherein the XR device communicates one or more scheduling parameters to the base station comprising a signal to noise interference ratio (SINR) and a power headroom.

11. A system for managing latency in an extended reality (XR) device comprising:

one or more processors; and one or more non-transitory computer-readable media storing instructions that, when executed by the one or more processors, cause the system to perform operations comprising:

communicating an indication to a base station that the extended reality device is performing XR activity;

receiving, from the base station, a first high latency indication;

implementing a first set of one or more latency mitigation actions;

receiving a second high latency indication, wherein the first high latency indication is associated with a future latency exceeding a first predetermined threshold and the second high latency indication is associated with the future latency exceeding a second predetermined threshold, the second predetermined threshold being greater than the first predetermined threshold; and implementing a second set of one or more latency mitigation actions, wherein the second set of one or more latency mitigation actions have a greater impact on the XR activity than the first set of one or more latency mitigation actions.

12. The system of claim 11, wherein the one or more latency mitigation actions comprises reducing a number of degrees of freedom associated with the XR activity.

13. The system of claim 11, wherein the one or more latency mitigation actions comprises modifying a compression rate or a rendering rate.

14. The system of claim 11, wherein the one or more latency mitigation actions comprises utilizing buffered data for display on a graphic user interface of the XR device.

15. The system of claim 11, wherein the one or more latency mitigation actions comprises reducing a display frame rate on a graphic user interface of the XR device.

16. One or more non-transitory computer-readable media storing instructions that, when executed by one or more processors of an extended reality (XR) device, cause the XR device to perform operations comprising:

communicating an indication to a base station that the extended reality device is performing XR activity;

receiving, from the base station, a first high latency indication;

implementing a first set of one or more latency mitigation actions;

receiving a second high latency indication, wherein the first high latency indication is associated with a future latency exceeding a first predetermined threshold and the second high latency indication is associated with the future latency exceeding a second predetermined threshold, the second predetermined threshold being greater than the first predetermined threshold; and implementing a second set of one or more latency mitigation actions, wherein the second set of one or more latency mitigation actions have a greater impact on the XR activity than the first set of one or more latency mitigation actions.

17. The one or more non-transitory computer-readable media of claim 16, wherein the one or more latency mitigation actions comprises reducing a number of degrees of freedom associated with the XR activity.

18. The one or more non-transitory computer-readable media of claim 16, wherein the one or more latency mitigation actions comprises modifying a compression rate or a rendering rate.

19. The one or more non-transitory computer-readable media of claim 16, wherein the one or more latency mitigation actions comprises utilizing buffered data for display on a graphic user interface of the XR device.

* * * * *